United States Patent
Ogawa et al.

(10) Patent No.: US 9,876,781 B2
(45) Date of Patent: Jan. 23, 2018

(54) INFORMATION PROCESSING DEVICE

(71) Applicant: Sony Computer Entertainment Inc., Tokyo (JP)

(72) Inventors: Tomohiro Ogawa, Kanagawa (JP); Yoshihiko Suwa, Kanagawa (JP); Akitsugu Tsuchiya, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 87 days.

(21) Appl. No.: 14/897,837

(22) PCT Filed: Mar. 3, 2014

(86) PCT No.: PCT/JP2014/001154
§ 371 (c)(1),
(2) Date: Dec. 11, 2015

(87) PCT Pub. No.: WO2014/203436
PCT Pub. Date: Dec. 24, 2014

(65) Prior Publication Data
US 2016/0112399 A1  Apr. 21, 2016

(30) Foreign Application Priority Data

Jun. 21, 2013  (JP) .................................. 2013-131129

(51) Int. Cl.
*H04L 29/06* (2006.01)
*G06F 21/31* (2013.01)
(Continued)

(52) U.S. Cl.
CPC ............ *H04L 63/083* (2013.01); *G06F 21/31* (2013.01); *H04L 63/105* (2013.01);
(Continued)

(58) Field of Classification Search
CPC . H04L 63/083; H04L 63/105; H04L 63/1441; H04L 67/143; H04L 9/3213; G06F 21/31; G06F 2221/2139
See application file for complete search history.

(56) References Cited

U.S. PATENT DOCUMENTS 5,991,882 A  11/1999  O'Connell
6,978,385 B1  12/2005  Cheston
(Continued)

FOREIGN PATENT DOCUMENTS

JP   11212922 A    8/1999
JP   2006155636 A  6/2006
(Continued)

OTHER PUBLICATIONS

Preliminary Report on Patentability and Written Opinion for corresponding PCT Application No. PCT/JP2014/001154, 9 pages, dated Dec. 30, 2016.
(Continued)

*Primary Examiner* — Ghodrat Jamshidi
(74) *Attorney, Agent, or Firm* — Matthew B. Dernier, Esq.

(57) ABSTRACT

A login controller has a function of allowing a user to log in to an information processing apparatus. A sign-in controller has a function of allowing the user to sign in to a network service provided by a server. At login time, a login information receiving unit receives a pass code input by the user for login authentication. A login processing unit performs login authentication using the received pass code. If it is determined that the pass code received by the login processing unit is incorrect, a sign-in processing unit causes the user to sign out of the network service. When the user again signs in to the network service, a screen generating unit receives the pass code for login authentication. A registration processing section then registers the received pass code in a
(Continued)

registered user information holding section as a new pass code.

7 Claims, 13 Drawing Sheets

(51) Int. Cl.
    *H04L 29/08*     (2006.01)
    *H04L 9/32*     (2006.01)

(52) U.S. Cl.
    CPC ........ *H04L 63/1441* (2013.01); *H04L 67/143* (2013.01); *G06F 2221/2139* (2013.01); *H04L 9/3213* (2013.01)

(56) References Cited

U.S. PATENT DOCUMENTS

| | | | |
|---|---|---|---|
| 7,353,536 | B1 | 4/2008 | Morris |
| 8,155,622 | B1* | 4/2012 | Moshenberg ......... H04L 63/101 |
| | | | 455/268 |
| 8,700,748 | B2 | 4/2014 | Iwaya |
| 9,055,128 | B2 | 6/2015 | Iwaya |
| 2006/0095785 | A1 | 5/2006 | White, Jr. |
| 2006/0123463 | A1 | 6/2006 | Yeap |
| 2009/0259774 | A1 | 10/2009 | Chen |
| 2010/0281252 | A1 | 11/2010 | Steeves |
| 2011/0107400 | A1 | 5/2011 | Shankaranarayanan |
| 2011/0307583 | A1 | 12/2011 | Iwaya |
| 2012/0203880 | A1* | 8/2012 | Kluyt ........................ G06F 9/54 |
| | | | 709/223 |
| 2013/0104121 | A1 | 4/2013 | Iwaya |
| 2014/0006341 | A1* | 1/2014 | Lopulalan ............... G06F 17/30 |
| | | | 707/608 |

FOREIGN PATENT DOCUMENTS

| | | |
|---|---|---|
| JP | 2006277715 A | 10/2006 |
| JP | 2011258142 | 12/2011 |
| JP | 2012003329 A | 1/2012 |

OTHER PUBLICATIONS

International Search Report for corresponding PCT Application No. PCT/JP2014/001154, 2 pages, dated Jun. 3, 2014.
Supplemental Partial European Search Report for corresponding EP Application No. EP14813139, 7 pages, dated Dec. 6, 2016.
Supplemental European Search Report for corresponding EP Application No. EP14813139, 14 pages, dated Mar. 7, 2017.
Office Action for corresponding CN Application No. 201480033765.3, 18 pages, dated Jun. 20, 2017.

\* cited by examiner

FIG. 2
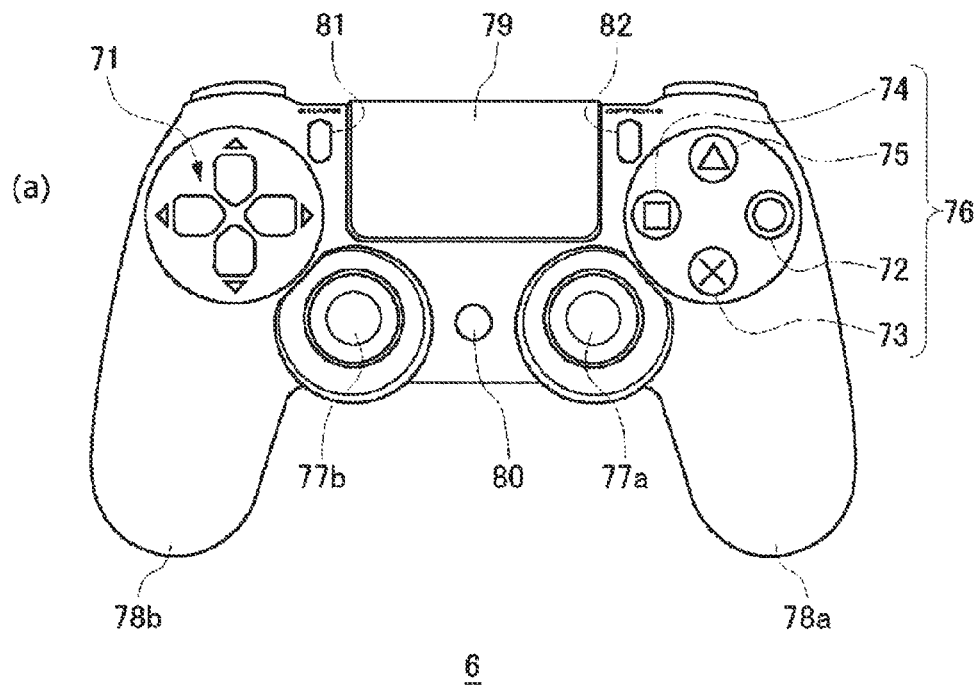
(a)
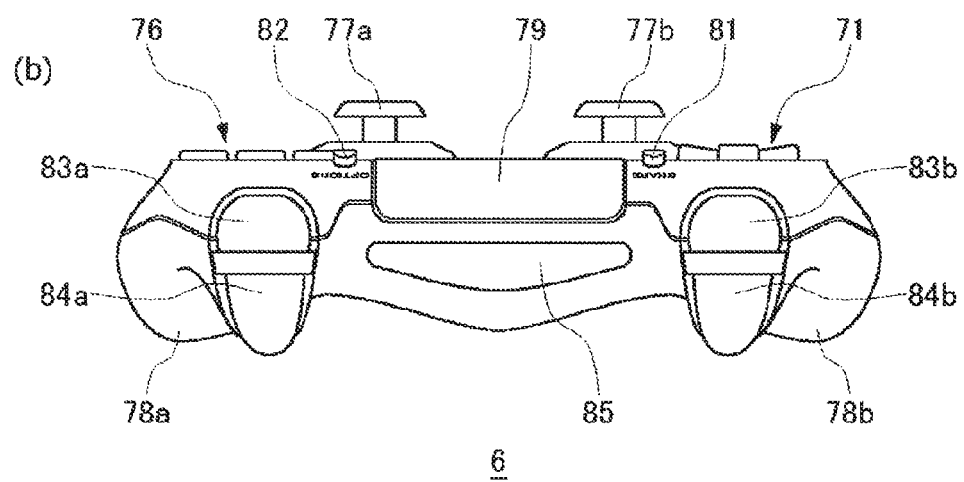
(b)

FIG.7

(a)
REGISTER YOUR NETWORK ACCOUNT

DO YOU HAVE A NETWORK SERVICE ACCOUNT?

YES, I HAVE.

NO, I DON'T.

✕ BACK     ○ ENTER

4

(b)
REGISTER YOUR NETWORK ACCOUNT

SIGN-IN ID (EMAIL ADDRESS) [          ]

PASS CODE [          ]

SIGN IN

HAVE YOU FORGOTTEN YOUR SIGN-IN PASS CODE?

✕ BACK     ○ ENTER

4

FIG. 9
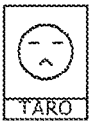
(a)
(b)
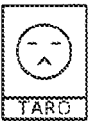
(c)

FIG.11
(a) 
4
(b) 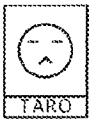
4
(c) 
4

FIG.12

HAVE YOU FORGOTTEN YOUR PASS CODE?

TO RESET YOUR LOG-IN PASS CODE, YOU MUST SIGN IN TO THE NETWORK SERVICE.

SIGN IN

✕ BACK    ◯ ENTER

SIGN IN

SIGN-IN ID (EMAIL ADDRESS)

PASS CODE

SIGN IN

HAVE YOU FORGOTTEN YOUR SIGN-IN PASS CODE?

✕ BACK    ◯ ENTER

4

INFORMATION PROCESSING DEVICE

TECHNICAL FIELD

The present invention relates to an information processing apparatus such as a game machine.

BACKGROUND ART

Authentication technology involving the combination of a user ID and a password is used extensively in diverse situations. For example, Patent Literature 1 discloses an information processing system in which an authentication server authenticates the sign-in ID and a sign-in password of a user.

CITATION LIST

Patent Literature

[PTL 1] JP 2012-3329A

SUMMARY

Technical Problem

In general, a browser for viewing the Internet has a function of storing the login ID and login password of a user for subsequent automatic input so that the user will not need to input the login ID and login password every time he/she logs in. Whereas this function is intended to save the trouble of the user's input, the function is not suitable for use with a system capable of accessing data belonging to individuals. For example, a game machine stores save data that belongs to individuals. This requires avoiding the situation where another individual would log in using the login ID of an authorized user to make unauthorized use of that user's save data.

It is thus preferred that an information processing apparatus such as the game machine handling the data belonging to individuals should demand the input of a login password every time a user attempts to log in. If the user forgets his/her password, login is naturally impossible. Where the login password is saved, for example, on a server of a game system, the password may be retrieved from that server. Where the login password is not saved, the user is unable to log in without setting a login password again. However, if anyone can reset the login password on a game machine that can be used by multiple users, a so-called impersonating user could reset the login password to make unauthorized use of the save data.

It is therefore an object of the present invention to provide a scheme by which an authorized user is able to reset a pass code easily.

Solution to Problem

In solving the above problem and according to one embodiment of the present invention, there is provided an information processing apparatus including: a login controller configured to allow a user to log in to the information processing apparatus; and a sign-in controller configured to allow the user to sign in to a service provided by a server. The login controller includes: a first receiving section configured to receive a pass code input by the user for login authentication; and a first processing section configured to perform login authentication using the pass code received by the first receiving section. The sign-in controller includes a second receiving section configured to receive a pass code for sign-in authentication after the first processing section has determined that the pass code received by the first receiving section is incorrect or that the input of the pass code for login authentication is skipped by the user. After it is determined that the pass code for sign-in authentication is correct, the login controller allows the user to log in.

According to another embodiment of the present invention, there is provided an information processing apparatus including: a login controller configured to allow a user to log in to the information processing apparatus; and a sign-in controller configured to allow the user to sign in to a service provided by a server. The login controller includes: a first receiving section configured to receive a pass code input by the user for login authentication; and a first processing section configured to perform login authentication using the pass code received by the first receiving section. The sign-in controller includes a second receiving section configured to allow the user to sign out of the service provided by the server after the first processing section has determined that the pass code received by the first receiving section is incorrect or that the input of the pass code for login authentication is skipped by the user.

According to a further embodiment of the present invention, there is provided an information processing apparatus including: a registration processing section configured to register a pass code for login authentication; a login controller configured to allow a user to log in to the information processing apparatus; and a sign-in controller configured to allow the user to sign in to a service provided by a server. The login controller includes: a first receiving section configured to receive the pass code input by the user for login authentication; and a first processing section configured to perform login authentication using the pass code received by the first receiving section. The sign-in controller includes a second receiving section configured to receive a pass code for sign-in authentication after the first processing section has determined that the pass code received by the first receiving section is incorrect or that the input of the pass code for login authentication is skipped by the user. After it is determined that the pass code for sign-in authentication is correct, the registration processing section enables a new pass code to be registered for login authentication.

Incidentally, if other combinations of the above-outlined composing elements or the above expressions of the present invention are converted between different forms such as a method, a device, a system, a recording medium, and a computer program, they still constitute effective embodiment of this invention.

BRIEF DESCRIPTION OF DRAWINGS

FIG. 2(a) is a diagram illustrating an external configuration of the top side of an input device, and FIG. 2(b) is a diagram illustrating an external configuration of the rear side of the input device.

FIGS. 7(a) and 7(b) are diagrams illustrating a network account registration screen.

FIGS. 9(a) through 9(c) are diagrams illustrating a login pass code registration screen.

FIGS. 11(a) through 11(c) are diagrams illustrating a login pass code input screen.

FIG. 12 is a diagram illustrating a confirmation screen for starting sign-in processing.

FIG. 13 is a diagram illustrating a sign-in pass code input screen.

DESCRIPTION OF EMBODIMENT

Figure 1:
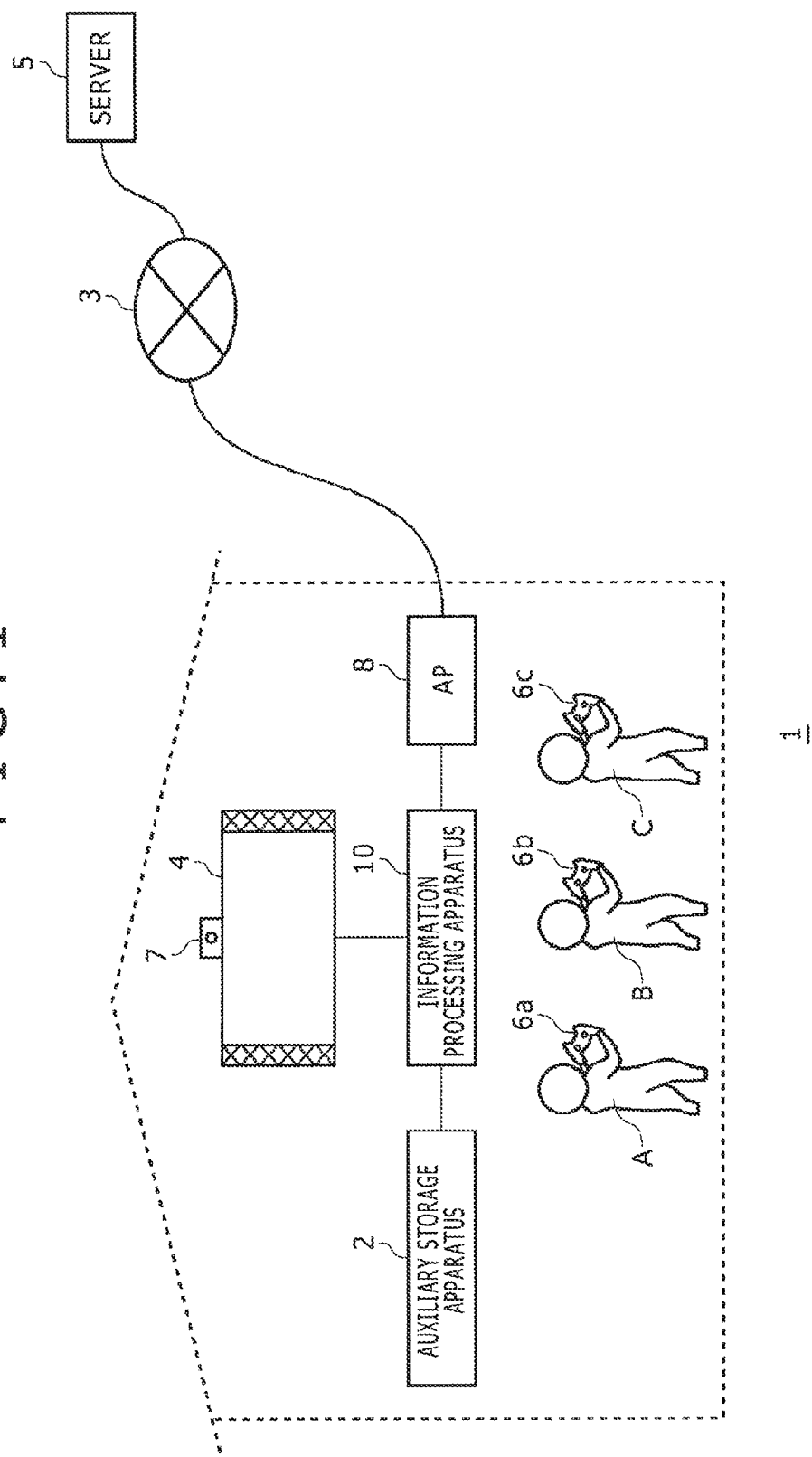
FIG. 1 is a diagram illustrating an information processing system as one embodiment of the present invention.

FIG. 1 shows an information processing system 1 as one embodiment of the present invention. The information processing system 1 has an information apparatus 10 as a user terminal and a server 5. The information processing apparatus 10 and the server 5 are connected with one another via a network 3. An auxiliary storage apparatus 2 is a mass storage device such as an HDD (hard disk drive) or a flash memory. This device may be an external storage device connected with the information processing apparatus 10 through a USB (Universal Serial Bus). Alternatively, this device may be a built-in storage device. An output device 4 may be a television set having a display for outputting images and speakers for outputting audio, or may be a computer display. The output device 4 may be connected to the information processing apparatus 10 in a wired (with cable) or a wireless manner. The information processing apparatus 10 is connected in wired or wireless fashion to an input device 6 operated by a user. The input device 6 outputs to the information processing apparatus 10 operation signals indicative of the results of user operations. Upon receipt of the operation signals from the input device 6, the information processing apparatus 10 allows the signals to be reflected on the processing performed by the applications and causes the output device 4 to output processing results. The input device 6 is configured to have multiple input sections such as multiple pushbuttons, an analog stick for entering analog quantities, and a rotary button.

In the information processing system 1, the information processing apparatus 10 is a game machine for executing games. The input device 6 is a device that provides user operation signal to the information processing apparatus 10 such as a game controller. A camera 7 acting as an imaging device is installed near the output device 4 to obtain images of the space around the output device 4. Whereas FIG. 1 shows an example in which the camera 7 is mounted on top of the output device 4, the camera 7 may be located alternatively on one side of the output device 4. In any case, the camera 7 is located in such a manner that an image of the user playing games in front of the output device 4 will be obtained.

An access point (hereafter referred to as "AP") 8 has the functions of a wireless access point and a router. The information processing apparatus 10 is connected to the AP 8 in a wireless or wired manner, thereby being communicably connected to the server 5 on a network 3.

The server 5 provides network services to users of the information processing system 1. The server 5 manages network accounts for user identification, and each user uses his or her account to sign in on network services provided by the server 5. By signing in on a network service from the information processing apparatus 10, each user is able to register in the server 5 game save data and trophies won as virtual prizes during playing of a game. In addition, in the information processing system 1 of this embodiment, two or more users operating different information processing apparatuses 10 may take part in an online game. The server 5 may function as a game server for managing game sessions.

In FIG. 1, the server 5 may be represented as a server that consolidates the above-mentioned functions. Therefore, the server 5 may be physically configured by two or more servers and each of these servers may be maintained and managed by the entity according to each function.

In FIG. 1, three users A, B, and C are playing a game by use of the same information processing apparatus 10. Each user is logged in on the OS of the information processing apparatus 10 and is able to store save data in the information processing apparatus 10 and get trophies every time the user has achieved missions in the game. When each user logs in, the OS associates the user with the device (the input device 6). In this example, the OS associates an input device 6a with the user A, an input device 6b with the user B, and an input device 6c with the user C. Therefore, the game can identify the users from the information (game controller IDs for example) for identifying the input device 6.

FIG. 2(a) shows an external configuration of the top of the input device 6. A user holds a left-side grip 78b by the left hand and a right-side grip 78a by the right hand, thereby operating the input device 6. On the top housing surface the input device 6, a direction key 71, an analog sticks 77a and 77b, and four types of operation buttons 76 as input units are arranged. Four types of buttons 72 through 75 are marked with different symbols of different colors for discrimination from each other. That is, the circle button 72 is marked with a red circle, the X button 73 is marked with a blue X, the square button 74 is marked with a violet square, and the triangle button 75 is marked with a green triangle. On the top housing surface, a touch pad 79 is provided in a flat area between the direction key 71 on the one hand and the operation buttons 76 on the other hand. The touch pad 79 also functions as a depression button which is depressed when pressed by the user and which returns to its initial position when released.

Between the two analog sticks 77a and 77b, a function button 80 is arranged. The function button 80 is used to turn on the power to the input device 6 to activate the communication function for simultaneously connecting the input device 6 and the information processing apparatus 10. It should be noted that, if the main power is off, and the information processing apparatus 10 is in a standby state, pressing the function button 80 causes the information processing apparatus 10 to receive a connection request from the input device 6 as an instruction to turn on the main power, the request thereupon turning into an active sate from the standby sate. After the connection of the input device 6 to the information processing apparatus 10, the function button 80 is used also to display a menu screen on the information processing apparatus 10.

A SHARE button 81 is arranged between the touch pad 79 and the direction key 71. The SHARE button 81 is used to enter instructions from the user into the OS or system software in the information processing apparatus 10. In addition, an OPTION button 82 is arranged between the touch pad 79 and the operation buttons 76. The OPTION button 82 is used to enter instructions from the user into an application (a game) that is executed in the information processing apparatus 10. The SHARE button 81 and the OPTION button 82 may be formed as push buttons.

FIG. 2(b) shows an external configuration of the rear side of the input device. At the top of the housing rear side of the input device 6 is the touch pad 79 extending from the housing top. At the bottom of the housing rear is a horizontally elongated light-emitting block 85. The light-emitting block 85 has red (R), green (G), and blue (B) LEDs, which are turned on in accordance with light-emitting color information transmitted from the information processing apparatus 10. A shown in FIG. 1, when three input devices 6a, 6b, and 6c are used, the information processing apparatus 10 may define the turn-on colors of the light-emitting blocks 85 of the input devices 6a, 6b, and 6c in different colors, namely, red, green, and blue, respectively, in order to allow the users A, B, and C to distinguish the input devices 6. Consequently, each user is able to recognize the input device 6 used by him or her by the turn-on color of the light-emitting block 85, thereby reducing the possibility of using a wrong input device 6.

On the housing rear side, an upper button 83a, a lower button 84a, an upper button 83b, and a lower button 84b are arranged at symmetrical positions in the longitudinal direction. The upper button 83a and the lower button 84a are operated by the index finger and the middle finger, respectively, of the right hand of the user and the upper button 83b and the lower button 84b are operated by the index finger and the middle finger, respectively, of the left hand of the user. As shown, the arrangement of the light-emitting block 85 between the row of the right-side upper button 83a and the lower button 84a and the row of left-side upper button 83b and the lower button 84b avoids the hindrance by the index finger and the middle finger, thereby allowing the camera 7 to suitably taking an image of the turned-on light-emitting block 85. The upper buttons 83 may be formed as push buttons and the lower buttons 84 as trigger buttons which are turnably supported.

Figure 3:
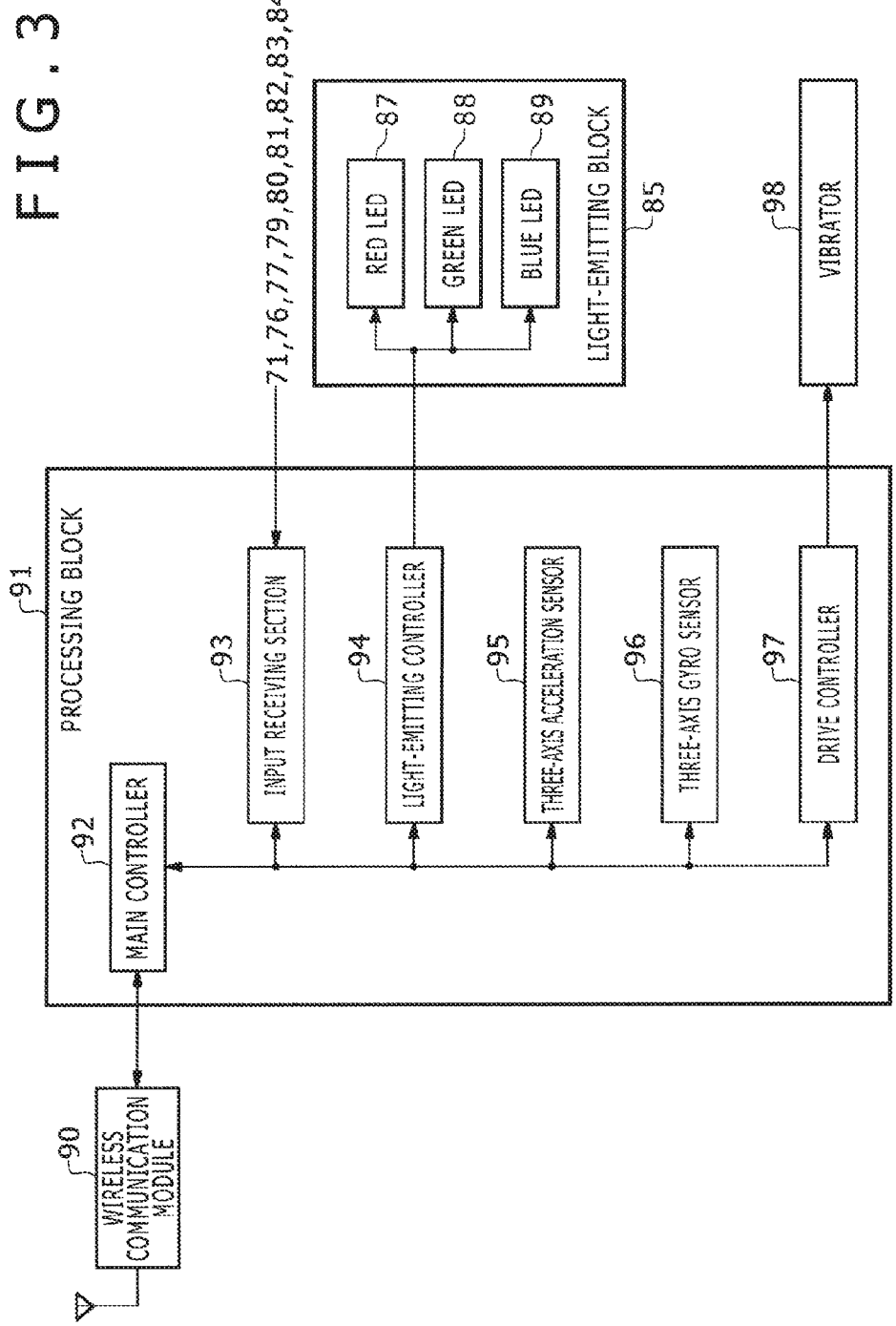
FIG. 3 is a diagram illustrating an internal configuration of the input device.

FIG. 3 shows an internal configuration of the input device 6. The input device 6 has a wireless communication module 90, a processing block 91, a light-emitting block 85, and a vibrator 98. The wireless communication module 90 has a function of transmitting and receiving data with a wireless communication module of the information processing apparatus 10. The processing block 91 executes predetermined processing in the input device 6.

The processing block 91 has a main controller 92, an input receiving section 93, a light-emitting controller 94, a three-axis acceleration sensor 95, a three-axis gyro sensor 96, and a drive controller 97. The main controller 92 transmits and receives necessary data with the wireless communication module 90.

The input receiving section 93 receives input information from input blocks such as the direction key 71, the operation buttons 76, the analog sticks 77, the touch pad 79, function button 80, the SHARE button 81, the OPTION button 82, the upper buttons 83, and the lower buttons 84, and transmits the received input information to the main controller 92. The main controller 92 converts the received input information into a predetermined control signal as required and supplies the resultant predetermined signal to the wireless communication module 90. The wireless communication module 90 transmits the received control signal to the information processing apparatus 10 with a predetermined timing. The light-emitting controller 94 controls the light emission of the red LED 87, the green LED 88, and the blue LED 89 that make up the light-emitting block 85.

In the information processing system 1 of the present embodiment, when the user presses the function button 80 with the information processing apparatus 10 in a standby state, the input device 6 is powered on, the main controller 92 generates a connection request for connection with the information processing apparatus 10, and the wireless communication module 90 transmits the generated connection request to the information processing apparatus 10. The wireless communication module of the information processing apparatus 10 is in an active state even if the main power is off (in a standby sate) and, upon reception of the connection request, the information processing apparatus 10 turns on the main power to start up the OS (system software), thereby establishing wireless connection with the input device 6. The system software of the information processing apparatus 10 determines the turn-on light color of the light-emitting block 85 of the input device 6 that has transmitted the connection request and transmits the emitted light color information to the input device 6. At this moment, it is preferable that the system software analyzes the color information included in the space shot by the camera 7, identifies the color not included in the environmental colors as far as possible, and determines the emitted light color of the light-emitting block 85. Consequently, after turning on of the light-emitting block 85, the light-emitting block 85 turned on in the specified emitted light color can be preferably detected from the taken image captured by the camera 7.

The emitted light color information received by the wireless communication module 90 is passed to the main controller 92. The main controller 92 notifies the light-emitting controller 94 of the emitted light color information. This allows the light-emitting controller 94 to make the light-emitting block 85 emit light in the specified color.

The vibrator 98 is configured by an eccentric motor or the like and driven by the drive controller 97. The three-axis acceleration sensor 95 detects an acceleration component in three-axis direction (X, Y, and Z) of the input device 6, and the three-axis gyro sensor 96 detects angular speeds in XZ plane, ZY plane, and YX plane.

Figure 4:
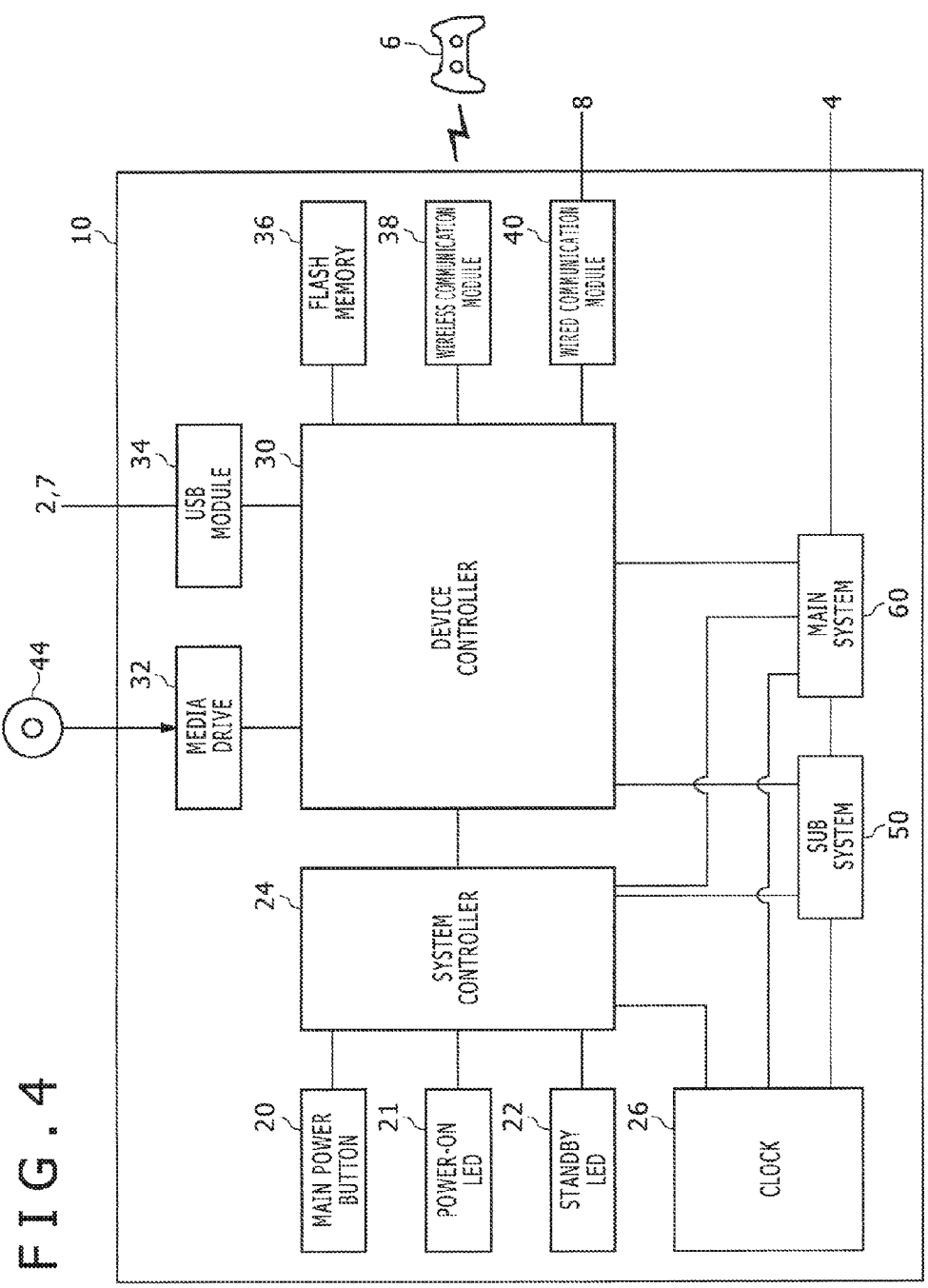
FIG. 4 is a diagram illustrating functional blocks of an information processing apparatus.

FIG. 4 shows a functional block diagram of the information processing apparatus 10. The information processing apparatus 10 is configured by a main power button 20, a power-on LED 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 is configured by a main CPU (Central Processing Unit) and the sub system 50 is configured by a sub CPU. The main CPU and the sub CPU operate exclusively with each other; namely, while the main CPU has been started up and is in an active state, the sub CPU is in a standby state and, while the sub CPU has been started up and is an active state, the main CPU is in a standby state. The main power button 20 is an input block on which the user executes operation input, arranged on the front surface of the housing of the information processing apparatus 10, and operated to turn on or off the power to the main system 60 of the information processing apparatus 10. The main power is on denotes that the main system 60 is in an active state; the main power is off denotes that the main system 60 is in a standby state. The power-on LED 21 is turned on when the main power button 20 is turned on and the standby LED 22 is turned on when the main power button 20 is turned off.

The system controller 24 detects the pressing of the main power button 20 by the user. When the main power button 20 is pressed with the main power being off, the system controller 24 gets this pressing operation as "on-instruction"; on the other hand, when the main power button 20 is pressed with the main power being on, the system controller 24 acquires this pressing operation as "off-instruction." It should be noted that, as described above, on/off of the main power can be controlled from the input device 6; when the function button 80 of the input device 6 is pressed with the main power being off, the system controller 24 acquires this button operation as "on-instruction."

Upon receiving an on-instruction, the system controller 24 notifies the sub system 50 in an active state of a detection result and, at the same time, turns off the standby LED 22 and turns on the power-on LED 21. At this moment, the sub system 50 starts up the main system 60, thereby getting into a standby mode. On the other hand, upon receiving an off instruction, the system controller 24 notifies the main system 60 in an active state of a detection result and, at the same time, turns off the power-on LED 21 and turns on the standby LED 22. At this moment, the main system 60 starts up the sub system 50, thereby getting into a standby mode. The clock 26 is a realtime clock to generate current date and time information and supplies the generated current date and time information to the system controller 24, the sub system 50, and the main system 60.

The device controller 30 is configured as an LSI (Large-Scale Integrated Circuit) that executes the transfer of information between devices like a south bridge. As shown, the device controller 30 is connected to devices such as the system controller 24, the media drive 32, the USB module 34, the flash memory 36, the wireless communication module 38, the wired communication module 40, the sub system 50, and the main system 60. The device controller 30 absorbs differences in electric characteristics and data transfer speeds between devices, thereby controlling data transfer timing.

The media drive 32 is a drive unit that drives a loaded ROM media 44 recorded with application software such as games and reads programs and data from the ROM media 44. The ROM media 44 is a read-only recording media such as an optical disc and a Blu-ray disc.

The USB module 34 is a module that is connected to external devices with USB cables. The USB module 34 may be connected to the auxiliary storage apparatus 2 that is a hard disk drive with a USB cable. In addition, the USB module 34 may be connected to the camera 7 with a USB cable. The flash memory is an auxiliary storage apparatus that provides an internal storage. The wireless communication module 38 communicates with the input device 6 for example in a wireless manner by a communication protocol such as Bluetooth (trademark) protocol or IEEE802.11 protocol. It should be noted that the wireless communication module 38 may be compliant with the third-generation (3rd Generation) digital mobile phone system based on the IMT-2000 (International Mobile Telecommunication 2000) specified by ITU (International Telecommunication Union). The wireless communication module 38 may further comply with a higher-generation digital mobile phone system. The wired communication module 40 communicates with external devices in a wired manner and is connected to the network 3 via the AP 8, for example.

The main system 60 has the main CPU, a memory that is a main storage apparatus and a memory controller, and GPU (Graphics Processing Unit). These functions may be configured as a system-on-chip and formed on one chip. The main CPU has a function of starting up the OS and executing applications installed in the auxiliary storage apparatus 2 under an environment provided by the OS.

Figure 5:
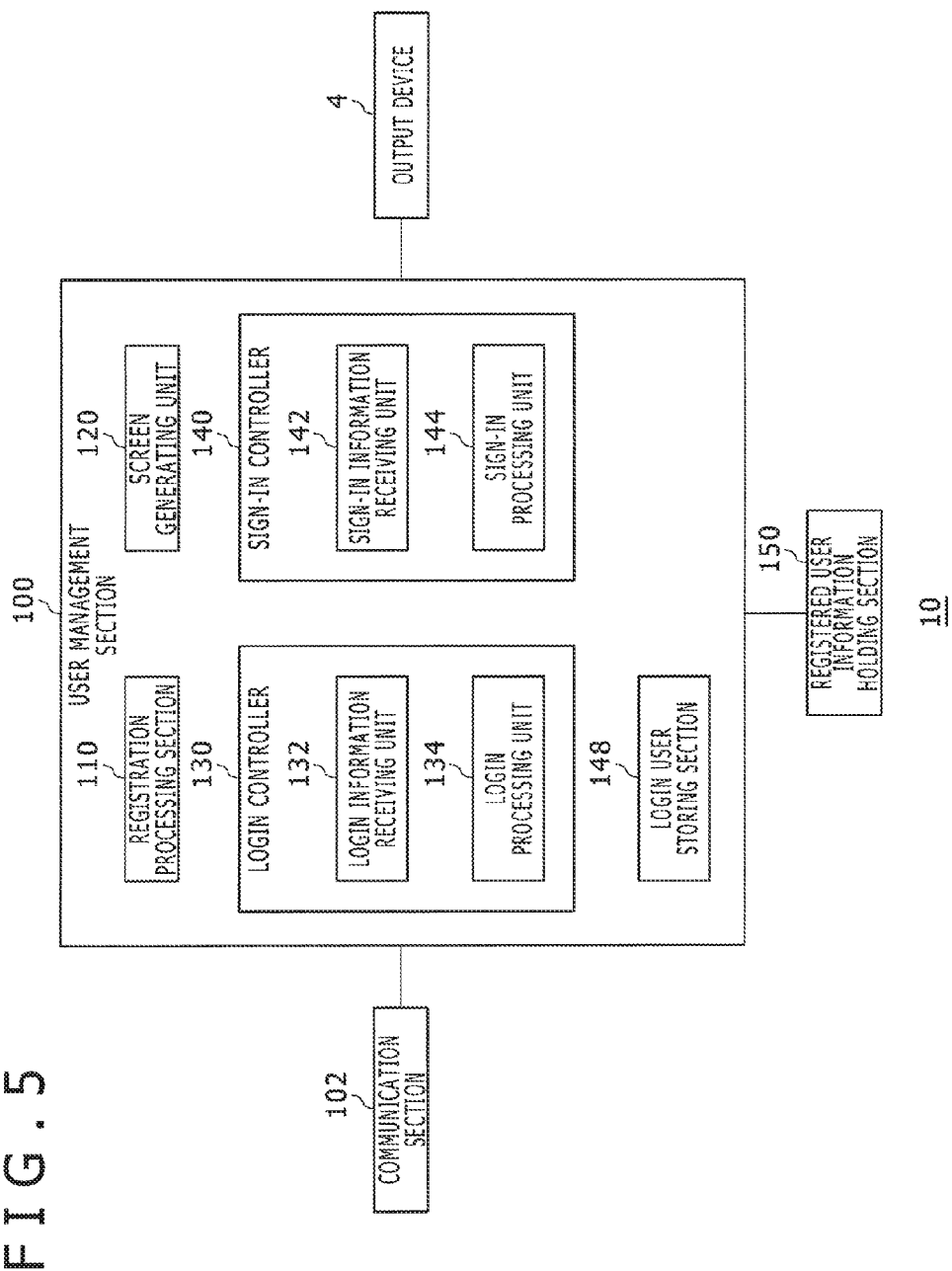
FIG. 5 is a diagram illustrating an internal configuration of the information processing apparatus.

FIG. 5 shows an internal configuration of the information processing apparatus 10. The information processing apparatus 10 has a communication section 102, a user management section 100, and a registered user information holding section 150. The user management section 100 is implemented by the OS (system software) of the information processing apparatus 10 and by application executed by the OS. The user management section 100 has a registration processing section 110, a screen generating unit 120, a login controller 130, a sign-in controller 140, and a login user storing section 148. The login controller 130 has the function of allowing the user to log in to the information processing apparatus 10. The sign-in controller 140 has the function of allowing the user to log in to a network service provided by the server 5. The registered user information holding section 150 and login user storing section 148 may be provided in the storage area of the auxiliary storage apparatus 2. The communication section 102 is indicative of the functions of the wireless communication module 38 and wired communication module 40 shown in FIG. 4.

In FIG. 5, the elements described as function blocks that execute various types of processing can be configured by a circuit blocks, memories, and other LSIs in terms of hardware; in terms of software, these functional blocks are realized by programs and so on loaded in memories. Therefore, it is known by those skilled in the art that these functional blocks can be realized by only hardware, only software, or combinations thereof without limitation to any thereof.

In this embodiment, the OS of the information processing apparatus 10 manages the login of the user to the information processing apparatus 10 as well as the sign-in of the user to the service provided by the server 5. In order to log in on the OS of the information processing apparatus 10, each user must acquire a user account. In what follows, a user account necessary for logging in on the information processing apparatus 10 is referred to as a "local account." When a user uses the information processing apparatus 10 for the first time, the user registers the local account into the information processing apparatus 10 by following a predetermined procedure. At this time, registering a combination of keys of the input device 6 as a pass code in advance, the user can prevent a situation where another user executes login with the local account of the user concerned.

It should be noted that the server 5 holds the accounts (hereafter referred to as "network accounts") of users who use the information processing system 1. Each network account is linked to a user and is related with the online ID (a nickname on a network) or icon image for example of the user. If the user used information processing apparatuses (game devices) of old generations in the past, it is often that the user already has a network account in the information processing system 1. In registering a local account, the information processing apparatus 10 relates this local account with the network account. This allows the user to store trophies won by using the information processing apparatus 10 and game save data into the server 5.

It should also be noted that, if the user does not have a network account, the user signs in on the server 5 by use of the information processing apparatus 10, to be more specific, registers the sign-in ID (email address) and the sign-in pass code, thereby getting the network account from the server 5.

<Registration of Local Account>

When the user logs in to the information processing apparatus 10 for the first time, the screen generating unit 120 provides, on a display of the output device 4, a user interface by which to register the local account. The screen generating unit 120 generates image data to be displayed on the output device 4. The screen displayed on the output device 4 shows a focus frame that is movable by the user operating the input device 6. The user is able to move the focus frame to a desired area by operating the direction key 71 provided on the input device 6. In the screen examples shown in FIG. 6 and in the subsequent drawings, the focus frame is represented by thick lines.

The screen generating unit 120 displays on the output device 4 a screen that includes at least one button area indicative of the detail of processing and a confirmation of the user's intention, for example. The user may operate the direction key 71 to move the focus frame to any one of the button areas and press a relevant input unit (e.g., circle button 72) on the input device 6, thereby executing the processing related to the focused button area. The screen generating unit 120 further causes the output device 4 to display a screen including an input area in which the user makes input. With the input area enclosed by the focus frame, the user is allowed to input a character string or a code string, for example, to the input area by operating the input device 6. As described above, the user proceeds with user registration work by operating the input units on the input device 6.

Figure 6:
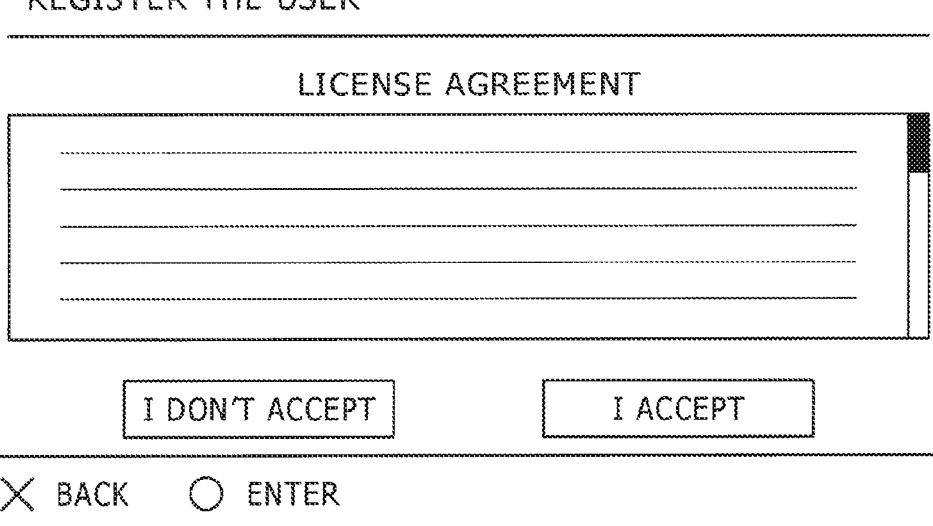
FIG. 6 is a diagram illustrating an initial screen for user registration.

FIG. 6 shows an input screen for user registration. The initial screen displays the details of the license agreement on the information processing apparatus 10. The user starts registration work by accepting the license agreement. Specifically, the user points the focus frame to the area indicating "I accept" and presses the enter button (circle button 72) to start user registration work.

FIG. 7(a) shows a screen for querying whether the user has a network account. When the user accepts the license agreement on the initial screen shown in FIG. 6, the screen generating unit 120 causes the output device 4 to display the query screen shown in FIG. 7(a). Explained below is the user registration work performed when the user already has a network account.

The user presses the circle button 72 of the input device 6 while viewing the query screen of FIG. 7(a). This causes a network account registration screen shown in FIG. 7(b) to be displayed. On this registration screen, the user inputs the information that he/she input in the past when obtaining the network account, i.e., a sign-in ID (email address) and a sign-in pass code. The sign-in pass code is made up of a combination of symbols and alphanumeric characters.

The user inputs the sign-in ID and sign-in pass code, points the focus frame to "SIGN IN," and press the circle button 72. This causes the network account to be registered with the information processing apparatus 10 and allows the user to sign in to the network service provided by the server 5. Specifically, upon receipt of the sign-in ID and the sign-in pass code by a sign-in information receiving unit 142 in the sign-in controller 140, a sign-in processing unit 144 transmits the received sign-in ID and sign-in pass code to the server 5 through the communication section 102. Following authentication by the server 5, the sign-in processing unit 144 allows the user to sign in to the network service. More specifically, when the combination of the sign-in ID and the sign-in pass code is determined to be correct, the server 5 returns authentication information called a token to the sign-in processing unit 144. The sign-in processing unit 144 acquires the returned authentication information, and the registration processing section 110 stores the authentication information into the registered user information holding section 150. This enables the user to sign in to the network service.

When the sign-in ID and sign-in pass code are input, the registration processing section 110 generates a local account and gives it to the user. Alternatively, when the user accepts the license agreement on the initial screen in FIG. 6, the registration processing section 110 may generate a local account; when the sign-in ID and pass code are input to the network account registration screen in FIG. 7(b), the registration processing section 110 may link the sign-in ID and pass code to the previously generated local account. The sign-in controller 140 receives from the server 5 the data linked to the network account. The data includes at least the online ID and icon image of the user. Explained below is an example in which an online ID "TARO" of the user A is acquired.

The registration processing section 110 stores the local account, network account, sign-in ID, sign-in authentication information (token), online ID, and icon image of the user into the registered user information holding section 150 as registered user information. Here, the user makes use of the local account when logging in to the information processing apparatus 10, and employs the network account when sign in to the server 5. With this embodiment, the situation where he/she has signed in means the case where the sign-in authentication information is held in the registered user information holding section 150. In contrast, the situation where the user has signed out signifies the case where the sign-in authentication information is not held in the registered user information holding section 150.

Figure 8:
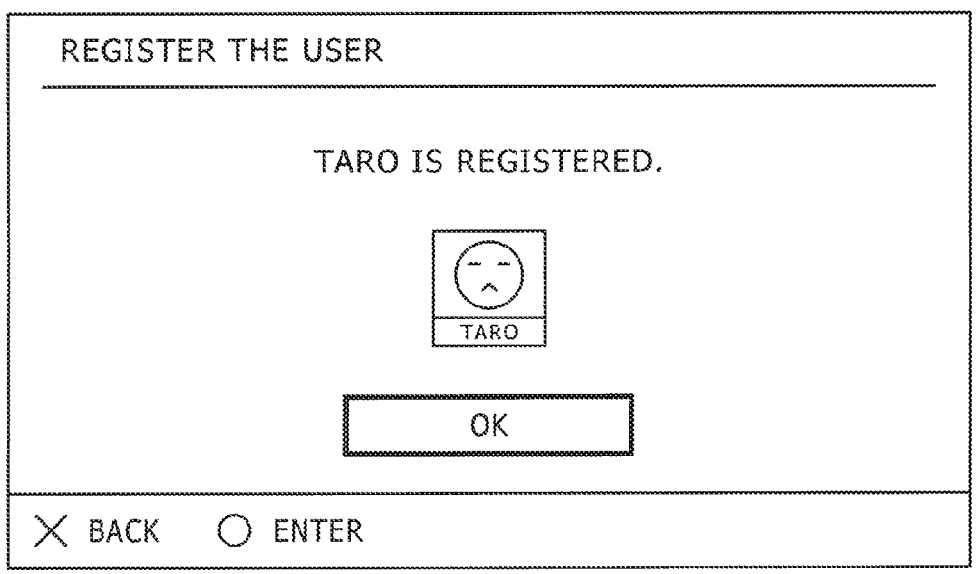
FIG. 8 is a diagram illustrating a user registration work complete screen.

FIG. 8 shows a user registration work complete screen. The screen generating unit 120 displays the online ID "TARO" and the user's icon image on the complete screen. When the registration processing section 110 stores the registered user information into the registered user information holding section 150, a login processing unit 134 authorizes the user to log in. This allows the user to enjoy applications such as games on the information processing apparatus 10. With this embodiment, a login signifies the state in which the OS identifies the user with the local account. When logging in to the information processing apparatus 10, the user is able to access the resources of the apparatus 10.

Explained above was the work procedure performed when one user logs in for the first time. Once the registration processing section 110 registers the user information such as the local account with the user information holding section 150, the user has no need to repeat the procedure thereafter. Multiple users including the users A, B and C have their local accounts registered with the information processing apparatus 10 of this embodiment. These users may thus log in concurrently to the information processing apparatus 10.

With a view to ensuring security, the information processing apparatus 10 of this embodiment has the function of authenticating a given user using a pass code at login time. After making user registration, the user thus sets a login pass code that is a key combination.

FIG. 9(a) shows an initial screen for registering a login pass code. The login pass code is composed of the combination of any four keys from among the direction key 71, square button 71, triangle button 75, upper buttons 83, and lower buttons 84. The combination may include multiple entries of the same input key. The login pass code is determined by four input keys and their sequence.

FIG. 9(b) shows a registration screen given when a login pass code is input. When the user presses input keys of the input device 6 four times, the combination of the pressed input keys is used as the login pass code of the user. For example, if the user presses the upward direction key 71, square key 74, triangle key 75, and downward direction key 71, in that order, on the input device 6, the key combination "↑□△↓" is registered as the login pass code. To have the login pass code ultimately registered requires that the user again input the same key combination for verification, as shown in FIG. 9(c). Comparing the login pass code with the sign-in pass code reveals that, whereas the login pass code is a combination of the input keys provided on the input device 6, the sign-in pass code is a combination of symbols and alphanumeric characters and may thus occur in far more variations than the login pass code.

When the user presses any input keys four times as described above, the registration processing section 110 registers the input key combination as the login pass code. Specifically, the registration processing section 110 stores the login pass code into the registered user information holding section 150 in association with the user's local account. Thereafter, the user's local account, login pass code, network account, sign-in ID, online ID, and icon image are associated with one another as the registered user information in the registered user information holding section 150. As mentioned above, when the has signed in to the network service, the sign-in authentication information (token) is held in the registered user information holding section 150.

The user logs in to the information processing apparatus of this embodiment and signs in to the network service provided by the server 5. As described above, the information processing apparatus 10 has the main system 60 and sub system 50, one of which is in an active state. In the information processing apparatus 10, either the main system 60 or the sub system 50 maintains the state of connection with the server 5 so that even when the user logs out of the information processing apparatus 10, the state of sign-in to the network service is maintained as long as the sign-in authentication information is held in the registered user information holding section 150. After the user has logged out, the main system 60, if kept in an active state, is thus connected communicably with the server 5. When the main power of the information processing apparatus 10 is turned off, the sub system 50 is connected communicably with the server 5.

In the information processing system 1 of this embodiment, once the user signs in to the network service, the sign-in state is thus maintained regardless of the user having logged in to or having logged out of the information processing apparatus 10. The sign-in state being maintained allows the information processing apparatus 10 to offer the user such advantages as downloading of content from the server 5 whenever desired or acquisition of messages from other users.

<Login Processing>
Explained below is the processing performed when the registered user logs in to the OS of the information processing apparatus 10. With the user having logged out of the information processing apparatus 10, pressing the function button 80 of the input device 6 causes the wireless communication module 90 to transmit the pressing information to the information processing apparatus 10. In the information processing apparatus 10, the communication section 102 receives the pressing information from the function button 80 as a connection request and establishes connection accordingly with the wireless communication module 90 and communication section 102. The pressing information from the function button 80 is also transmitted to the user management section 100.

The screen generating unit 120 reads the registered user information held in the registered user information holding section 150 to generate a select screen for selecting the users registered with the information processing apparatus 10. Specifically, the screen generating unit 120 reads the online IDs and icon images out of the registered user information to generate a select screen that lists the online IDs and icon images of the registered users.

Figure 10:
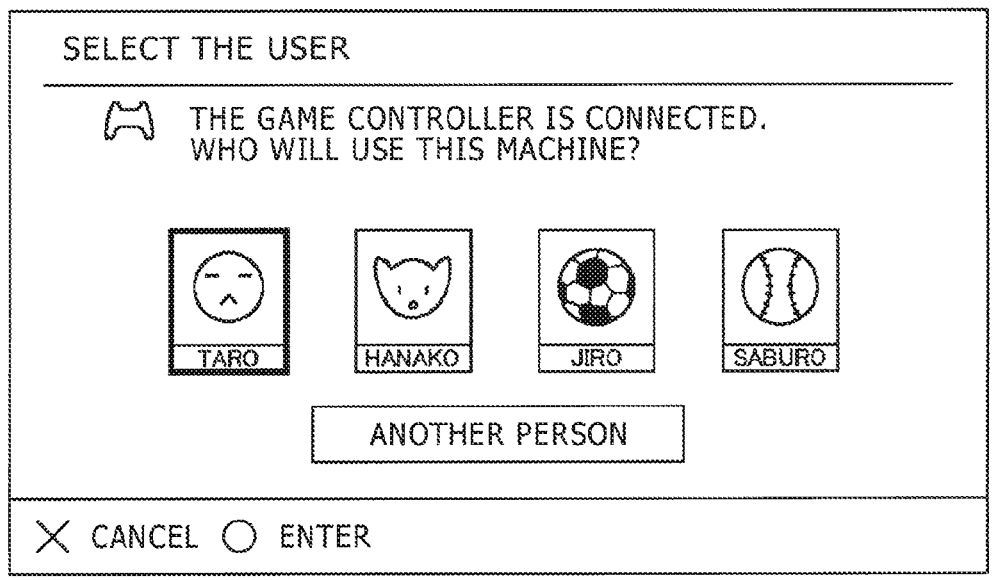
FIG. 10 is a diagram illustrating a user select screen at login time.

FIG. 10 shows a typical user select screen. On the user select screen, the user identification information including the online IDs and icon images is arranged in selectable fashion. On the user select screen, there may be provided an account setting area (not shown) in which a new user may register his/her local account for the first time. After selecting the account setting area using the input device 6, the user is able to perform local account registration work in keeping with the user registration screens shown in FIGS. 6 through 8.

On the user select screen shown in FIG. 10, the user identification information that may be displayed is limited to four items, for example. If there are more than four registered users, a user may operate the input units of the input device 6 to scroll the list of user identification information to the left or to the right. Also, by operating the button shown as "ANOTHER PERSON," a user may have the user identification information about up to four other users displayed. Alternatively, the screen generating unit 120 may arrange the user identification information in chronological order of the users' last login times (or last log-off times), most recent first. In the example shown in FIG. 10, an online ID "TARO" appears in the leftmost position (reference position), followed by online IDs "HANAKO," "JIRO" and "SABURO," in that order to the right. This means that the last login times of the online IDs "TARO," "HANAKO," "JIRO" and "SABURO" are close to the present time in that order.

On the user select screen, the screen generating unit 120 displays the focus frame enclosing the user information of one user in a manner movable over the list. By operating the direction key 71 of the input device 6, the user moves the focus frame onto the display region of his/her user identification information. Pressing the enter key (circle button 72) on the input device 6 allows the user to select his/her user identification information. Suppose now that the user A requesting a login is selecting "TARO" on the select screen by operating the input device 6a. In this case, the screen generating unit 120 generates a key combination input screen shown in FIG. 11(a). By operating the input keys of the input device 6a, the user A inputs his/her key combination that is a combination of four input keys.

FIG. 11(b) shows the state in effect after the user has input the key combination. A login information receiving unit 132 receives the pass code input by the user A for login authentication. The login processing unit 134 performs login authentication using the pass code received by the login information receiving unit 132. Specifically, the login processing unit 134 determines whether the pass code received by the login information receiving unit 132 is the same as the pass code held in the registered user information holding section 150. If the pass code input by the user A turns out to be the same as the pass code of the user A registered in the registered user information holding section 150, the login processing unit 134 determines that the input login pass code is correct and allows the user A to log in to the information processing apparatus 10. At this moment, the login processing unit 134 generates emitted-light color information specifying an emitted-light color for the input device 6a, with the communication section 102 transmitting the emitted-light color information to the input device 6a. In response, the input device 6a lights the light-emitting block 85 in the color specified by the emitted-light color information. The login processing unit 134 stores into the login user storing section 148 the login information, i.e., the information identifying the user A (user account), the information identifying the input device 6a used by the user A (game controller ID), and the emitted-light color information in association with one another.

Meanwhile, through the pass code input screen shown in FIG. 11(b), the user A may not be able to input the correct pass code that the user has forgotten. If the key combination input by the user A fails to match the user A's key combination held in the registered user information holding section 150, the login processing unit 134 determines that the input login pass code is incorrect. The login processing unit 134 then does not authorize the user A to log in to the OS of the information processing apparatus 10 and instructs the screen generating unit 120 to generate a login pass code re-input screen.

FIG. 11(c) shows a typical login pass code re-input screen. The screen generating unit 120 generates the pass code re-input screen and displays it on the output device 4. The login information receiving unit 132 receives the login pass code input by the user A. The login processing unit 134 determines whether the pass code received by the login information receiving unit 132 is the same as the pass code held in the registered user information holding section 150. If the pass codes match, the login processing unit 134 allows the user A to log in to the information processing apparatus 10. However, the user A may again input the wrong pass code. In this case, the login processing unit 134 obviously does not allow the user A to log in.

If the user A inputs the wrong login pass code, the login processing unit 134 supplies the screen generating unit 120 with an instruction to generate the pass code re-input screen to give the user a second chance to input the correct pass code. However, if the user A has completely forgotten the login pass code, the user A is unable to input the correct login pass code no matter how many times given a chance. The login processing unit 134 then counts the number of times the user A has input the wrong pass code, and gives the screen generating unit 120 the instruction to generate the re-input screen up to a predetermined number of times.

If the user fails to input the correct login pass code three times, the information processing apparatus 10 of this embodiment terminates display of the pass code input screen to prevent the user from further attempts to input the login pass code.

One type of making login authentication is that if the user A inputs the wrong login pass code a predetermined number of times, for example, the user A will be prevented from logging in by the login account (local account in the information processing system 1) associated with the pass code. In this case, the user A will have to acquire a new login account and again register a new login pass code. This, however, will make it impossible for the user A to make use of the save data obtained using the previous account.

Another way of making authentication is that if the user A inputs the wrong pass code a predetermined number of times, the information processing apparatus 10 will cancel the registered pass code and require the user A to again set a new pass code. With this way of authentication, one user is able to use the same login account, so that the inconvenience mentioned above does not occur. However, if another user impersonates the user A, the impersonating user might register a new pass code and make unauthorized use of the save data of the legitimate user A. In such a case, the legitimate user A having no knowledge of the pass code registered by the impersonating user will not be able to log in to the information processing apparatus 10.

The information processing apparatus 10 thus offers a scheme by which the user, who forgot the login pass code, can again set the pass code in a relatively easy manner.

If the user A inputs the wrong pass code three times in a row, the login processing unit 134 transmits an instruction to generate a sign-in screen to the screen generating unit 120. The conditions for transmitting the instruction to generate the sign-in screen may be that the user inputs the wrong pass code twice in a row or four or more times in a row. The conditions may be established as desired. In any case, when it is determined that the pass code received by the login information receiving unit 132 is incorrect, the login processing unit 134 notifies the sign-in controller 140 to that effect. As will be discussed later in relation to FIG. 14, the user A may have completely forgotten the login pass code. In that case, the user A may be allowed to skip pass code input instead of getting prompted to input the wrong pass code three times. Thus if it is determined that pass code input for login authentication is skipped by the user A, the login processing unit 134 may notify the sign-in controller 140 to that effect.

When the login processing unit 134 determines that the input pass code is incorrect or that login pass code input is skipped by the user A, the sign-in processing unit 144 causes the user A to sign out of the network service provided by the server 5. Specifically, the sign-in processing unit 144 discards (deletes) the sign-in authentication information (token) from the registered user information holding section 150 to cause the user to sign out of the network service. Even when the login processing unit 134 determines that the input pass code is incorrect or that login pass code input is skipped by the user, the registration processing section 110 will not change or cancel the login pass code registered in the registered user information holding section 150 unless the user again registers a new pass code, as will be discussed later. The user A, when caused to sign out of the network service after inputting the wrong pass code or after skipping pass code input, may not be presented with the login pass code input screen even if the identification information identifying the user A is selected on the user select screen, until the login pass code is again registered. Instead, the user A may be presented with the screen shown in FIG. 12, to be discussed later. Alternatively, when the user again signs in, the registration processing section 110 may cancel (delete) the login pass code registered in the registered user information holding section 150.

One advantage of the sign-in processing unit 144 arranging for the user A to sign out if the input pass code is incorrect or if pass code input is skipped is that the arrangement reinforces security when the user who has input the login pass code is not a legitimate user. Another advantage is that the arrangement provides a scheme by which the user A can again register the login pass code by signing in again to the network service using a user interface similar to the network account registration screen shown in FIG. 7(b).

When the sign-in processing unit 144 causes the user A to sign out of the network service, the screen generating unit 120 displays on the output device 4 a confirmation screen for making manual transition to sign-in processing.

FIG. 12 shows a confirmation screen for starting the sign-in process. When the user A presses the circle button 72 on the input device 6, the screen generating unit 120 displays on the output device 4 a pass code input screen for sign-in authentication. If the user A presses the cross button 73 on the input device 6, the screen generating unit 120 displays on the output device 4 the user select screen shown in FIG. 10.

FIG. 13 shows a sign-in pass code input screen for sign-in authentication. The sign-in pass code input screen is approximately the same as the network account registration screen shown in FIG. 7(b). Through the sign-in pass code input screen shown in FIG. 12, the user A inputs the sign-in ID (email address) and sign-in pass code. The sign-in information receiving unit 142 receives the input sign-in ID and sign-in pass code.

After inputting the sign-in ID and sign-in pass code, the user A points the focus frame to "SIGN IN" and presses the circle button 72. This causes the sign-in processing unit 144 to transmit the sign-in ID and sign-in pass code to the server 5 through the communication section 102. The server 5 performs sign-in authentication using the sign-in ID and sign-in pass code. If it is determined that the sign-in pass code is correct, the server 5 issues authentication information (token) indicative of permission to sign in. In turn, the sign-in processing unit 144 allows the user A to sign in to the network service.

After allowing the user A to sign in, the sign-in processing unit 144 instructs the screen generating unit 120 to generate a login pass code registration screen. Given the instruction from the sign-in processing unit 144, the screen generating unit 120 generates the registration screen for registering the login pass code, as illustrated in FIGS. 9(a) through 9(c). By use of the user interface shown in these drawings, the user A registers a new login pass code. The registration processing section 110 receives the key combination input by the user A through the registration screen as the new login pass code, and registers the login pass code in the registered user information holding section 150 in association with the user A's local account. In turn, the login processing unit 134 allows the user A to log in. In this manner, the information processing apparatus 10 enables the user to reset the login pass code on condition that the user who has forgotten the login pass code sign out of the network service to again sign in. That is, the registration processing section 110 permits registration of a new pass code for login authentication after it is determined that the input pass code for sign-in authentication is correct. By making effective use of the sign-in pass code for user authentication in the process of resetting the login pass code, the information processing apparatus 10 thus implements a simple scheme by which to reset the login pass code.

If the user A has forgotten the sign-in pass code, the user points the focus frame to "HAVE YOU FORGOTTEN YOUR SIGN-IN PASS CODE?" and presses the circle button 72. This causes the server 5 to transmit a sign-in pass code re-issuance notification mail to the registered email address of the user A. In turn, the user A is able to reset the sign-in pass code.

As described above, the registration processing section 110 changes the original login pass code if the user inputs a new pass code through the login pass code registration screen after signing in again to the network service following the user's failure to input the correct login pass code. That is, unless the user inputs a new pass code through the registration screen, the registration processing section 110 does not change or cancel the original login pass code registered in the registered user information holding section 150. This makes it possible to avoid the situation where an impersonating user who does not know the sign-in pass code might change the login pass code of the legitimate user.

The sign-in processing unit 144 causes the user to sign out of the network service if the input login pass code is incorrect. Alternatively, the sign-in processing unit 144 may also cause the user to sign out of the network service if login pass code input is skipped as mentioned above.

Figure 14:
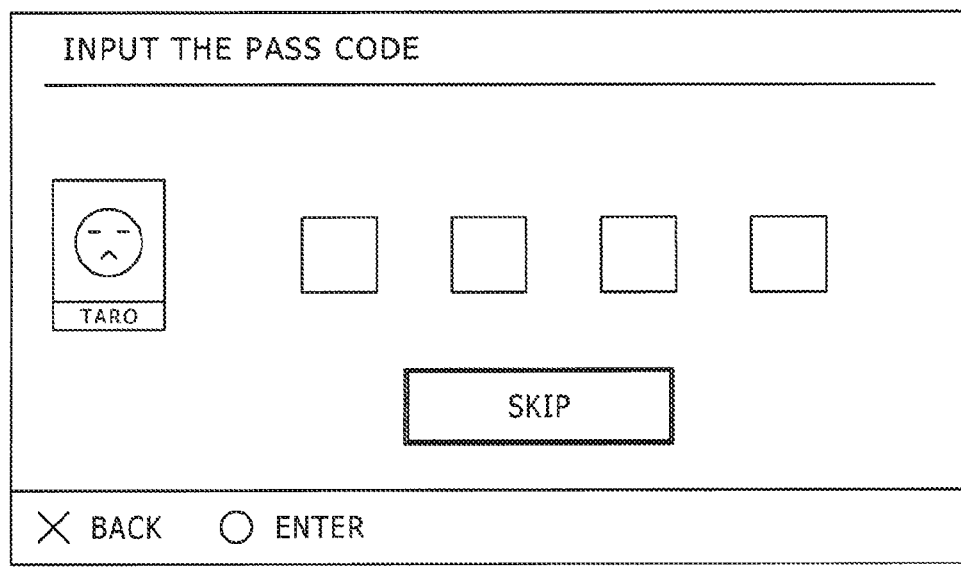
FIG. 14 is a diagram illustrating an alternative example of the login pass code input screen.

FIG. 14 shows an alternative example of the login pass code input screen. On this input screen, there is a button for skipping the input of the login pass code. The user may point the focus frame to the skip button and press the enter key (circle button 72) to skip login pass code input. This measure is provided to relieve the user of the trouble of inputting the login pass code three times when the user has completely forgotten the login pass code. When login pass code input is skipped, the sign-in processing unit 144 causes the user to sign out. The screen generating unit 120 displays on the output device 4 the confirmation screen, shown in FIG. 12, for starting the sign-in process.

While the present invention has been described in conjunction with a specific embodiment given as an example, it should be understood by those skilled in the art that the above-described composing elements and various processes may be combined in diverse ways and that such combinations, variations and modifications also fall within the scope of this invention.

In the above-described embodiment, if the login pass code input by the user is incorrect, the sign-in processing unit 144 causes the user to sign out of the network service. When the user subsequently inputs the correct sign-in ID and sign-in pass code, the sign-in processing unit 144 allows the user to sign in to the network service again. In the alternative example, if the login pass code input by the user is incorrect, the sign-in processing unit 144 does not cause the user to sign out of the network service. That is, the sign-in processing unit 144 does not discard the sign-in authentication information from the registered user information holding section 150, thereby maintaining the user's sign-in state. In this alternative example, the sign-in information receiving unit 142 also receives the sign-in ID and sign-in pass code input through the input screen shown in FIG. 13. The sign-in processing unit 144 transmits the received sign-in ID and sign-in pass code to the server 5 through the communication section 102. The server 5 performs sign-in authentication using the transmitted sign-in ID and sign-in pass code. If it is determined that the sign-in pass code is correct, the server 5 issues authentication information (token) indicative of permission to sign in and transmits the issued information to the information processing apparatus 10. After the sign-in processing unit 144 has acquired the sign-in authentication information, the registration processing section 110 may overwrite the sign-in authentication information in the registered user information holding section 150 with the acquired information. Thereafter, the user performs login pass code registration work as explained in connection with the above embodiment. The alternative example thus implements a simple scheme by which to reset the login pass code without causing the user to sign out.

Also in connection with the above-described embodiment, it was explained that after the pass code for sign-in authentication is determined to be correct, the login controller 130 allows the user to log in. Specifically, the registration processing section 110 does not change or cancel the login pass code registered in the registered user information holding section 150 unless the user again registers a login pass code. If the user does register the login pass code again, the login processing unit 134 allows the user to log in. Alternatively, even if the user does not re-register the login pass code, the registration processing section 110 may cancel the login pass code registered in the registered user information holding section 150 so that the login controller 130 may allow the user to log in. The timing for login pass code cancellation is when the pass code for sign-in authentication is determined to be correct, so that the user is again allowed to sign in. The login processing unit 134 may allow the user to log in when the user thus signs in again. In this manner, after it is determined that the pass code for sign-in authentication is correct, the login processing unit 134 may allow the user to log in at any timing.

Also in conjunction with the above-described embodiment, it was explained that the server 5 performs sign-in authentication using the sign-in ID and sign-in pass code. Alternatively, with the sign-in ID and sign-in pass code stored in the registered user information holding section 150, the sign-in processing unit 144 may carry out sign-in authentication.

Reference Signs List

1 . . . Information processing system, 4 . . . Output device, 5 . . . Server, 6 . . . Input device, 10 . . . Information processing apparatus, 50 . . . Sub system 60 . . . Main system, 100 . . . User management section, 102 . . . Communication section, 104 . . . Acquisition section, 110 . . . Registration processing section, 120 . . . Screen generating unit, 130 . . . Login controller, 132 . . . Login information receiving unit, 134 . . . Login processing unit, 140 . . . Sign-in controller, 142 . . . Sign-in information receiving unit, 144 . . . Sign-in processing unit, 148 . . . Login user storing section, 150 . . . Registered user information holding section.

INDUSTRIAL APPLICABILITY

The present invention is applicable to the field of information processing technologies.

The invention claimed is:

1. An information processing apparatus comprising: a login controller configured to allow a given user, among a plurality of users, to log in to a respective local account of the given user, among a plurality of respective local accounts of the plurality of users, on the information processing apparatus using a respective local account pass code, among a plurality of local account passcodes for the plurality of respective local accounts: and
a sign-in controller configured to allow the plurality of users to sign in to respective network accounts using respective network account pass codes through the information processing apparatus after successfully logging in to the respective local accounts, where each of the respective network accounts permits access to a service provided by a server; wherein
the login controller includes:
a first receiving unit configured to receive the respective local account pass code input by the given user for login authentication; and
a first processing unit configured to perform login authentication on the respective local account pass code received;
the sign-in controller includes
a second receiving unit configured to receive the respective network account pass code for sign-in authentication input by the given user after the first processing unit has determined that the respective local account pass code received by the first receiving unit is authentic;
a registration processing unit configured to: (i) move past the login authentication on the respective local account pass code received from the given user when the respective local account pass code received from the given user is incorrect or is skipped by the given user, (ii) permit the given user to enter the respective network account pass code, and (iii) permit the given user to at least one of log in to the information processing apparatus and reset the respective local account pass code, only when the respective network account pass code of the given user is authenticated.

2. The information processing apparatus according to claim 1, further comprising:
a screen generating unit configured to generate a registration screen for registering the respective local account pass code after it is determined that the respective network account pass code received by the second receiving unit for sign-in authentication is correct;
wherein the registration processing unit is configured to register the reset the respective local account pass code input by the given user through the registration screen as the respective local account pass code for login authentication.

3. The information processing apparatus according to claim 2, wherein
the sign-in controller includes a second processing unit configured to transmit the respective network account pass code received by the second receiving unit to the server;
after the server has determined that the respective network account pass code transmitted by the second processing unit for sign-in authentication is correct, the screen generating unit generates the registration screen for registering the respective local account pass code for login authentication; and
the registration processing unit registers the respective local account pass code input by the user through the registration screen as the respective local account pass code for login authentication.

4. The information processing apparatus according to claim 3, wherein, when the first processing unit determines that the respective local account pass code received by the first receiving unit is incorrect or that the respective local account pass code input for login authentication is skipped by the user, the second processing unit causes the given user to sign out of the service provided by the server.

5. The information processing apparatus according to claim 4, wherein
the second receiving unit receives the respective network account pass code for sign-in authentication after the second processing section has caused the given user to sign out of the service; and
the second processing unit transmits the respective network account pass code received by the second receiving unit to the server and, when the server determines that the transmitted respective network account pass code for sign-in authentication is correct, allows the given user to sign in to the service.

6. A method to be carried out by an information processing apparatus, the method comprising:
allowing a given user, among a plurality of users, to log in to a respective local account of the given user, among a plurality of respective local accounts of the plurality of users, on the information processing apparatus using a respective local account pass code, among a plurality of local account passcodes for the plurality of respective local accounts; and facilitating the plurality of users to sign in to respective network accounts using respective network account pass codes through the information processing apparatus after successfully logging in to the respective local accounts, where each of the respective network accounts permits access to a service provided by a server; wherein the method further includes:

receiving the respective local account pass code input by the given user for login authentication;

performing login authentication on the respective local account pass code received;

receiving the respective network account pass code for sign-in authentication input by the given user after the performing login authentication determines that the respective local account pass code received is authentic;

when the respective local account pass code received from the given user is incorrect or is skipped by the given user: (i) moving past the login authentication on the respective local account pass code received from by the given user, (ii) permitting the given user to enter the respective network account pass code, and (iii) permitting the given user to at least one of log in to the information processing apparatus and reset the respective local account pass code, only when the respective network account pass code of the given user is authenticated.

7. A non-transitory, computer readable recording medium containing a computer program, which when executed by a computer of an information processing apparatus, causes the computer to carry out actions, comprising:

allowing a given user, among a plurality of users, to log in to a respective local account of the given user, among a plurality of respective local accounts of the plurality of users, on the information processing apparatus using a respective local account pass code, among a plurality of local account passcodes for the plurality of respective local accounts: and facilitating the plurality of users to sign in to respective network accounts using respective network account pass codes through the information processing apparatus after successfully logging in to the respective local accounts, where each of the respective network accounts permits access to a service provided by a server: wherein the method further includes:

receiving the respective local account pass code input by the given user for login authentication:

performing login authentication on the respective local account pass code received:

receiving the respective network account pass code for sign-in authentication input by the given user after the performing login authentication determines that the respective local account pass code received is authentic:

when the respective local account pass code received from by the given user is incorrect or is skipped by the given user: (i) moving past the login authentication on the respective local account pass code received from by the given user, (ii) permitting the given user to enter the respective network account pass code, and (iii) permitting the given user to at least one of log in to the information processing apparatus and reset the respective local account pass code, only when the respective network account pass code of the given user is authenticated.

* * * * *

UNITED STATES PATENT AND TRADEMARK OFFICE
CERTIFICATE OF CORRECTION

PATENT NO. : 9,876,781 B2
APPLICATION NO. : 14/897837
DATED : January 23, 2018
INVENTOR(S) : Tomohiro Ogawa, Yoshihiko Suwa and Akitsugu Tsuchiya It is certified that error appears in the above-identified patent and that said Letters Patent is hereby corrected as shown below:

In the Claims

In Column 18
Line 59 of Claim 5, change "transmitted respective" to --respective--.

In Column 20
Line 24 of Claim 6, change "from by" to --from--;
Line 24 of Claim 7, change "from by" to --from--; and
Line 26 of Claim 7, change "from by" to --from--.

Signed and Sealed this
Seventeenth Day of April, 2018

Andrei Iancu
*Director of the United States Patent and Trademark Office*